No. 695,130. Patented Mar. 11, 1902.
W. S. ADAMS.
BRAKE MECHANISM.
(Application filed July 27, 1900.)
(No Model.) 3 Sheets—Sheet 3.

Witnesses,
C. W. Benjamin
C. G. Hensley

Inventor,
Walter S Adams
by Joseph R. Levy
atty

THE NORRIS PETERS CO., PHOTO-LITHO., WASHINGTON, D. C.

UNITED STATES PATENT OFFICE.

WALTER S. ADAMS, OF PHILADELPHIA, PENNSYLVANIA, ASSIGNOR TO JOHN A. BRILL, OF PHILADELPHIA, PENNSYLVANIA.

BRAKE MECHANISM.

SPECIFICATION forming part of Letters Patent No. 695,130, dated March 11, 1902.

Application filed July 27, 1900. Serial No. 25,000. (No model.)

*To all whom it may concern:*

Be it known that I, WALTER S. ADAMS, a citizen of the United States, residing in the city and county of Philadelphia, State of Pennsylvania, have invented certain new and useful Improvements in Brake Mechanisms, of which the following is a specification.

My invention relates to improvements in brake mechanisms for railroad-cars, more especially adapted for use on pivotal trucks of the type having large and small wheels and known as "maximum-traction" trucks.

My invention has for its object the production of a light, efficient, and economical brake mechanism; and it consists in the novel details of improvement hereinafter described, and further pointed out in the claims.

Figure 1:
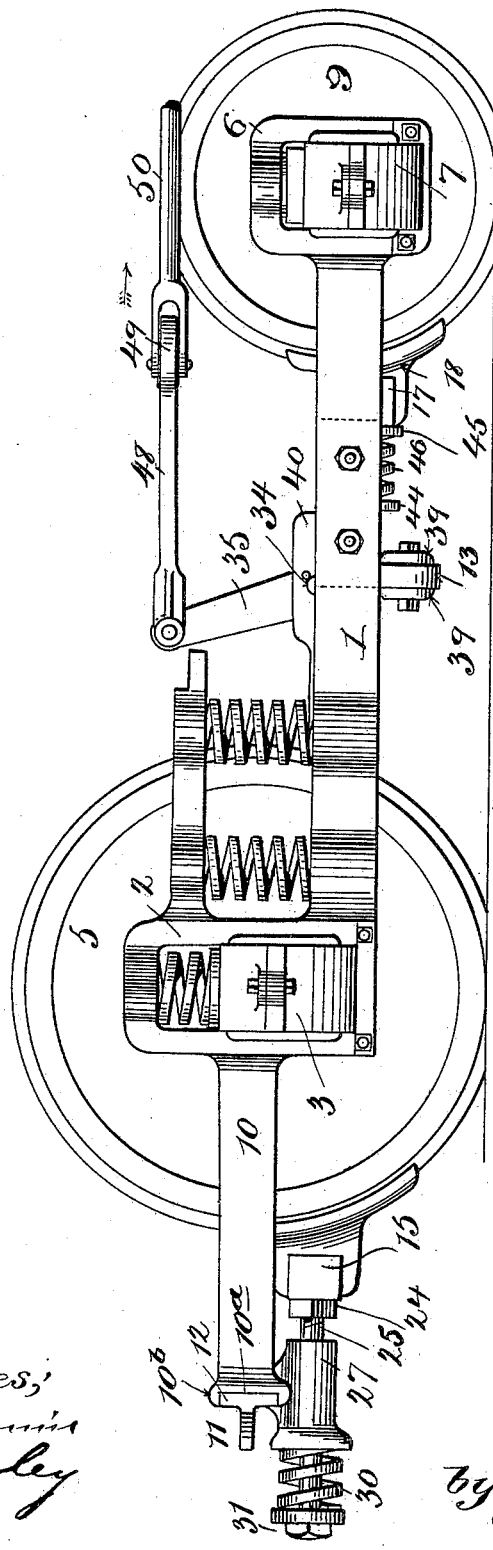
Figure 2:
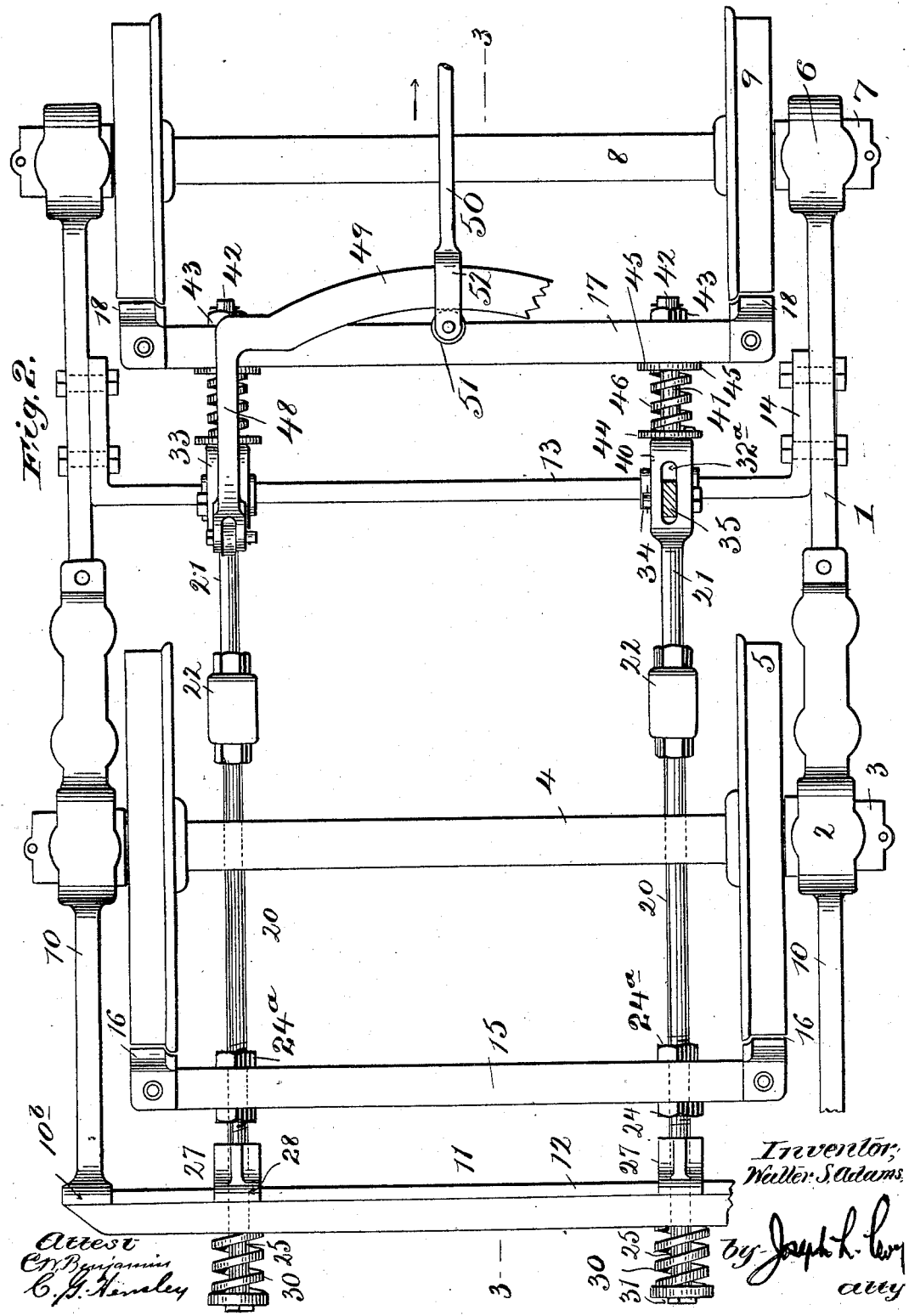
Figure 3:
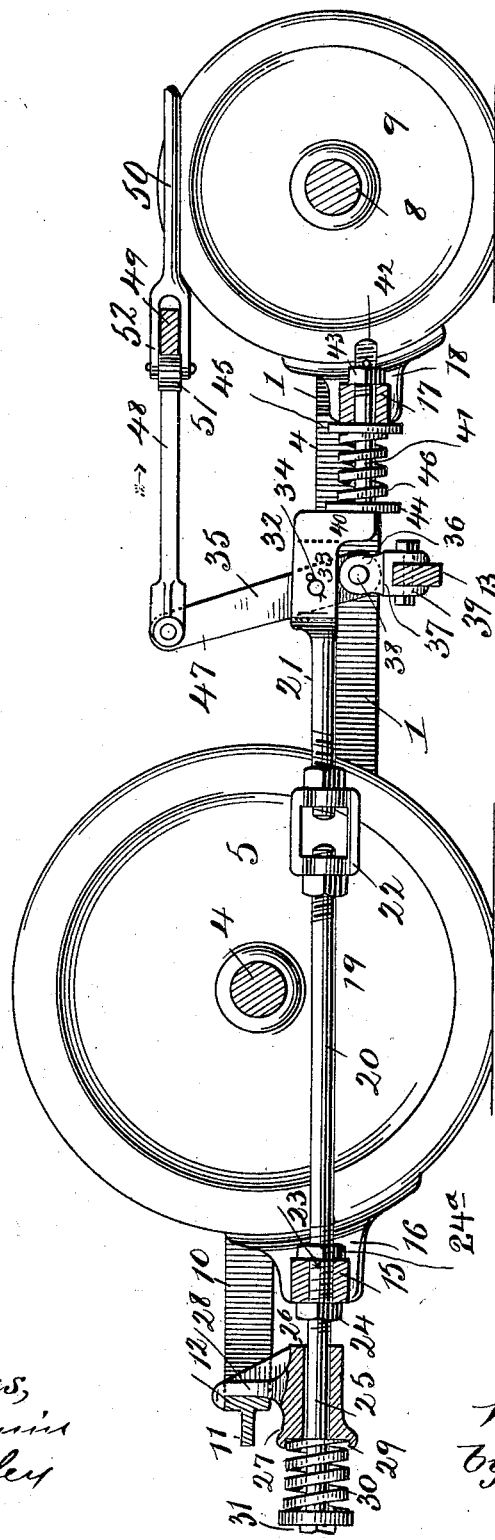
Figure 4:
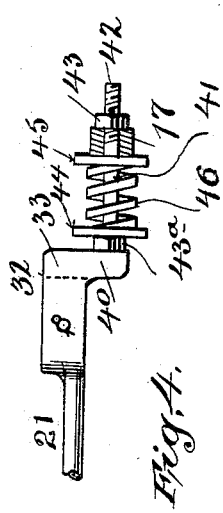

In the accompanying drawings, forming part of this specification, Figure 1 is a side elevation of a car-truck of a special type provided with my improved brake. Fig. 2 is a plan view, partly in section. Fig. 3 is a sectional elevation substantially on the line 3 3, Fig. 2; and Fig. 4 is a side elevation of detached parts.

I have illustrated the improved brake in connection with a truck in which large and small wheels and an eccentric pivot are employed, as it has many features of especial utility in connection with this form of truck, as hereinafter set forth. However, it will be apparent the same may be advantageously employed in trucks of other constructions.

As illustrated, the truck embodies the side frames 1, having axle-box pedestals or yokes 2 for the axle-boxes 3 for the axle 4 of the large or driving wheel 5, the yokes 6 for the axle-boxes 7 for the axle 8 of the smaller or trailing wheels 9, the yokes 2 having extensions 10, connected transversely by the angle-iron cross-bar 11, having a base-web 12, secured directly to the recess $10^a$ of the enlargement $10^b$. The side bars 1 are transversely connected between the wheels by a cross-bar 13, having inturned ends 14, bolted to the side bars, as shown in Fig. 2, the latter cross-bar being bent down, as in Figs. 1 and 3, between the side bars, all of which are of the usual or desired construction.

The brake is designed so as to be direct-acting, in which the rods, brake-beams, and shoes all move in the same direction.

In the illustrated embodiment of my invention, 15 is the brake-beam, and 16 the suitably-connected brake-shoes, for the large wheels 5, and 17 the brake-beam, and 18 the brake-shoes, for the small wheels 9, (both sets of shoes moving in the same direction,) each set of shoes moving in the same direction to or from the tread of the wheels.

At 19 are the brake-rods longitudinally disposed and located adjacent the wheels to allow clearance for the motor, &c., which rods comprise the front and rear sections 20 21, adjustably connected together intermediate their extremities by the turnbuckles 22 in well-known manner. As both rods and the devices operated thereby are of the same construction and relative location, a description of one rod will suffice for both. The rod-section passes loosely through the brake-beam 15 and is exteriorly threaded, as at 23, to adjustably receive the nuts or abutment-blocks 24 $24^a$ thereon on both sides of the brake-beam, the extension 25 of the rod-section passing loosely through the bore 26 of a thrust-block or casting 27, the latter having an upright arm 28 lipped over the web 12 of the cross-bar 11, to which the arm is securely bolted or otherwise fastened. The outer end of the block 27 is recessed, as at 29, to form a spring-seat for the spiral (or other form, if desired) spring 30 for the large wheel-brake shoes 16, the outer end of the spring bearing against a spring cup or follower 31, secured to extension 25, the spring surrounding the rod. Thus the brake-beam 15 and shoes 16 are supported by the brake-rods which have their bearings in the blocks 27, and said beam and shoes partake of the longitudinal movements of the brake-rods, owing to the firm connection of the beam with the rod. The rod-section 21 has between its extremities a vertically-slotted yoke 32, through the walls 33 of which passes a pin 34, on which is pivotally mounted an upright lever 35, pivotally secured below the pin 34 to the jaw 36 of a pivot-block 37 by means of the pin 38, the pivot-block having a lower jaw 39, which embraces the cross-bar 13 and to which it is secured, as shown in Fig. 3.

As shown in Fig. 3, the rod-section 21 is expanded laterally and vertically to provide sufficient metal for the formation of the yoke 32, the slot in which through which the lever 35 passes being shown at 32ª, Fig. 2, the yoke having a pendent extension 40, from the face of which extends a thrust-bar 41, located below the plane of the rod-section 21, the bend or gooseneck thus formed in the rod by the angular yoke 32 providing clearance for the operation of the lever and bringing the thrust-bar into an operative plane with the tread of the wheels 9, which is lower than that of the wheels 5.

The bar 41 passes loosely through the brake-beam 17, the outer end 42 being threaded for adjustment and carrying the nut 43 adjustably thereon, and between the face of the extension 40 and the beam 17 are arranged spring-plates 44 45 and an intermediate spiral (or other form) spring 46, by preference there being a nut 43ª working on threads on the bar 41, as shown in Fig. 4, and located back of the spring 46, preferably between the extension 40 and plate 44, whereby the tension of the spring can be regulated and the shoe 18 can be adjusted toward the wheel to compensate for wear. The beams 17 and shoes 18 are thus supported by the brake-rod and partake of its movements. By supporting the rods directly upon the truck-frame and the brake beams and shoes upon the brake-rods, as distinguished from supporting the shoes by links from the truck-frame and connecting the beams with the shoes, so as to cause the beams to be supported by the shoes, as has been the prior practice, the customary support through such brake-hangers and their links is dispensed with. The beam and shoes are supported entirely by the brake rod or rods and which former have no connection to the truck-frame except indirectly through the casting 27 and pivot 38 or equivalent support for the rods.

The upper ends 47 of the levers 35 are pivotally secured to the arms 48 of the segmental bar 49 and in their turn to the pull-rod 50, leading from a suitable or usual source of power, the rod being movably connected with the equalizing-bar by the roller 51, secured to the forked end 52 of the rod 50, all in the usual way.

When the brake mechanism is designed for use on trucks of the type shown herein, it is preferred that the spring 30 be initially of greater resisting capacity than the springs 46, so that the pressure of the shoes on the wheels can be apportioned to the load with reasonable exactness, the large or driving wheels 5 taking usually about eighty per cent. and the small wheels 9 about twenty, the nuts 24 24ª 43 43ª or turnbuckle 22 being afterward used for adjustment. The shoes being off, movement of the rod 50 in the direction of the arrow will draw the rods 19 rearwardly, (toward the right in the drawings,) bodily carrying the respective sets of shoes to the treads of the wheels against the stress of the springs. The springs 46 being of less resistance than the springs 30 allow the shoes 16 to be applied or take a bearing before the shoes 18, and by a continuance of the pressure or power both sets of shoes take bearing on the wheels' treads to the extent designed. On the release of the pressure the springs 30 act to retract or release the shoes.

As will be observed, the movement of the brake-rods is a direct one, whereby great rapidity of action may be obtained, and the brake rods and beams have but two points of suspension as to each—one pivotal, the other sliding—thereby doing away with extra parts or elements and unnecessary friction.

To allow for the slight rise of the rods 19 due to the arcial travel of the pin 34, provision for play between the rods and the beams and blocks can be made without undue rattling of the parts, or the thrust-bars can be allowed to rise slightly without injurious results.

Although I prefer to employ my movements in conjunction with the parallel rod 19, levers 35, and single equalizing-bar 49, so as to prevent swiveling and equalization of the pressure on all the shoes and to leave the space within the truck clear for the mounting of the motor, truck-bearings, &c., it is evident that my invention would be embodied in certain respects if only one rod 19 and its associated parts were used instead of two and, for example, located centrally of the beams, as it would be if the rod 20, Fig. 3, were used and it be centrally located relative to the length of the beams, or otherwise, as desired.

Having described my invention, I claim—

1. In a brake mechanism, the combination with the truck-frame, of a brake-rod, brake-beams supported by said rod, and brake-shoes supported by the beams, the rod being movably supported directly upon said frame, substantially as described.

2. In a brake mechanism, the combination with the truck-frame, of the longitudinal brake-rod movably supported on the truck-frame at one end, a brake-beam secured to said rod adjacent said end, shoes supported on and by said beams, a movable support for the rod on the truck-frame at the other end, a brake-beam secured to the rod at the latter end, and brake-shoes supported on and by said beams, substantially as described.

3. In a brake mechanism, the combination with the truck-frame, of a brake-rod supported for longitudinal movement at one end by said frame and pivotally supported by said frame at the other end, pairs of wheels for the truck, and beams and paired shoes supported the former on and by the rod the latter on and by the beams, substantially as described.

4. A brake mechanism comprising brake beams and shoes, a longitudinally-disposed brake-rod upon which the brake-beam is supported, and to which the beam is operatively connected, and means for supporting the brake-rod, substantially as described.

5. A brake mechanism comprising brake beams and shoes, a longitudinally-disposed brake-rod, a bearing for supporting the same to permit it to have longitudinal movement, means for supporting the brake-beam upon said rod, and means for operating the brake-rod, substantially as described.

6. A brake mechanism comprising brake beams and shoes, a brake-rod, means for supporting the same, means for firmly uniting one brake-beam to said rod to support and operate the beam thereby, the other brake-beam being movably supported by said rod, means to cause the rod to operate said beam, and means for operating said rod, substantially as described.

7. A truck-frame combined with a brake mechanism comprising brake beams and shoes, a longitudinally - disposed brake-rod directly supported on the truck-frame and adapted to operate directly one of the brake-beams, a spring interposed between the brake-rod and the other brake-beam, and means for drawing the brake-rod longitudinally to cause said spring to act on the adjacent brake-beam, substantially as described.

8. A truck-frame combined with a brake mechanism comprising brake beams and shoes, a longitudinally - disposed brake-rod directly supported on the truck-frame and adapted to operate one of the brake-beams directly, a spring interposed between the brake-rod and the other brake-beam, a lever to operate said brake-rod to cause said spring to push the adjacent brake-beam toward the wheels, and means for operating said lever, substantially as described.

9. A brake mechanism comprising a pair of brake beams and shoes, a brake-rod to draw one of the brake-beams toward the wheels, a spring to retract the brake-rod, an abutment for said spring, a spring interposed between the brake-rod and the other brake-beam, and means for causing the brake-rod to act upon said spring, substantially as described.

10. A brake mechanism comprising a pair of brake beams and shoes, a longitudinally-disposed brake-rod connected with one beam so as to draw said beam and shoes toward wheels, a spring to retract said brake-rod, an abutment for said spring, said brake-rod having a portion passing through the outer brake-beam, means connected with said rod to retract said beam from wheels, a spring interposed between said beam and the brake-rod, and means for operating said rod, substantially as described.

11. The combination of a truck frame and wheels, with a pair of brake beams and shoes, a longitudinally-disposed brake-rod, a stationary support for said rod carried by the frame, said brake-rod being connected with one brake-beam to draw the same toward wheels, said rod being movably connected with the other brake-beam, a spring interposed between said rod and the last-mentioned beam, and means for operating the rod, substantially as described.

12. The combination of a truck frame and wheels, with a pair of brake beams and shoes, a longitudinally-disposed brake-rod, a stationary support for said rod carried by the frame, said brake-rod being connected with one brake-beam to draw the same toward wheels, said rod being movably connected with the other brake-beam, a spring interposed between said rod and the last - mentioned beam, a lever pivotally supported by said frame and pivotally connected with said rod for operating the same, and means for actuating said lever, substantially as described.

13. The combination of a frame and wheels, with a pair of brake beams and shoes, a longitudinally-diposed brake-rod, a support for the same carried by the frame, a spring interposed between said rod and said support, a connection between said rod and one of the brake-beams to cause the rod to draw the latter toward wheels, said rod being movably connected with the other brake-beam, a spring interposed between the last-mentioned beam and the rod, and means for operating said rod, substantially as described.

14. The combination of a frame and wheels, with a pair of brake beams and shoes, a longitudinally-disposed brake-rod, a support for the same carried by the frame, a spring interposed between said rod and said support, connections between said rod and one of the brake-beams to cause the rod to draw the latter toward wheels against the stress of said spring, said rod being movably connected with the other brake-beam, a spring interposed between the last-mentioned beam and the rod, a lever pivotally supported by said frame and pivotally connected to said rod, and means for actuating the lever, substantially as described.

15. The combination of a truck frame and wheels, with a pair of brake beams and shoes, a longitudinally-disposed rod, a support carried by said frame and having a bearing for the rod to slide in, a spring to retract and oppose the sliding of the rod, means for connecting the rod with one of the brake-beams to draw the latter toward the wheels, the opposite end of said rod being movably connected with the other brake-beam, a spring interposed between said rod and latter beam, and means for operating said rod, substantially as described.

16. The combination of a truck frame and wheels, with a pair of brake beams and shoes, a longitudinally-disposed rod, a support carried by said frame and having a bearing for the rod to slide in, a spring of greater resisting capacity to retract and oppose the sliding of the rod, means for connecting the rod with one of the brake-beams to draw the latter toward the wheels, the opposite end of said rod being movably connected with the other brake-beam, a spring of lesser resisting capacity interposed between said rod and latter beam, and means for operating said rod substantially as described.

17. The combination of a truck frame and wheels, with brake beams and shoes, a longitudinally-disposed rod having a portion on one plane connected with one of the beams, a stationary support for said rod carried by the frame, means to retract the rod, another portion of said rod being on a lower plane than the first-mentioned portion and movably connected with the other beam, a spring surrounding the lower portion of the rod and interposed between the rod and last-mentioned beam, and means for operating said rod, substantially as described.

18. The combination of a truck frame and wheels, with brake beams and shoes, a longitudinally-disposed rod having a portion on one plane connected with one of the beams, a stationary support for said rod carried by the frame, means to retract the rod, another portion of said rod being on a lower plane than the first-mentioned portion and movably connected with the other beam, a spring surrounding the lower portion of the rod and interposed between the rod and the last-mentioned beam, a lever pivotally carried by the said frame and pivotally connected to the rod between its ends, and means for operating the lever, substantially as described.

19. The combination of a truck frame and wheels, with a pair of brake beams and shoes, a longitudinally-disposed rod connected with one of said beams, a stationary support for the rod on the truck-frame, a spring interposed between said rod and the other of said beams, said rod having a slotted yoke, a lever pivoted to said slot and pivotally connected with said frame, said rod having a pendent extension provided with a thrust-bar movably connected with the other brake-beam, and a spring interposed between said extension and said brake-beam, substantially as described.

20. The combination of a truck frame and wheels, with a pair of brake-beams, brake-shoes carried thereby, a longitudinally-disposed rod connected to one of said brake-beams, a stationary support for said rod carried by the truck-frame, a spring interposed between said support and an abutment upon the end of said rod, a slotted yoke carried by said rod, a lever pivoted in and passing through said slot, a pendent end provided upon said bar, a thrust-bar connected to said yoke and movably connected to the other brake-beam, a spring interposed between said extension and said brake-beam, and an abutment carried by said bar on the side of said beam opposite the spring, substantially as described.

21. The combination of a truck frame and wheels with a pair of brake beams and shoes, a longitudinally-disposed rod connected with one of said beams, a slotted yoke carried by said rod, a brake-lever passing through said slot and pivoted in said yoke, a support carried by said frame, through which said rod is adapted to slide, an abutment carried upon the end of said rod, a spring interposed between said abutment and said support, and mechanism movably connecting said rod with the other brake-beam, substantially as described.

22. The combination of a truck frame and wheels, with a pair of brake beams and shoes, a longitudinally-disposed rod connected with one of said beams, a slotted yoke carried by said rod, a brake-lever pivoted in said slot, and pivotally connected to the frame, a thrust-bar connected to said yoke, movably connected to said other brake-beam, a spring interposed between said bar and beam, and an abutment carried upon the end of said bar on the side of said brake-beam opposite said spring, substantially as described.

23. The combination in a car-truck, of the frame comprising side beams and cross-bars, and a brake mechanism comprising a longitudinally-extending rod supported directly from the truck-frame to the end and adapted to slide in its support, a brake-beam and brake-shoes supported by said rod, one of the cross-bars being between the wheels, an upwardly-extending operating-lever fulcrumed upon the latter cross-bar, the brake-rod being pivotally secured thereto above the latter's fulcrum, a brake-beam loosely supported upon the other end of the rod, an abutment on the rod between the latter beam and said lever, a spring interposed between said beam and said abutment, and brake-shoes on said latter beam.

24. The combination in a car-truck, of the truck-frame having a cross-bar 11 outside of one set of wheels, a cross-bar 13 between the wheels, the thrust-block secured to the bar 11, and having a longitudinal aperture, a brake-rod having one end extending through the aperture, the other end passing over the bar 13 toward the other set of wheels, a brake beam and shoes supported on the brake-rod adjacent the thrust-block, a brake-beam loosely supported upon the other end of the rod and carrying brake-shoes, an upright lever fulcrumed on the cross-bar 13, and pivotally connected to the brake-rod above said fulcrum, an abutment on the brake-rod, a spring interposed between said abutment and the loosely-connected brake-beam, and a retracting-spring on the end of the rod adjacent the thrust-block.

25. The combination in a car-truck, having a frame, a cross-bar 11 outside of the wheels at one end, another cross-bar 13 between the wheels, with the parallel brake-rods, supports on the cross-bar 11 permitting the rod to slide therein, a brake-beam extending between the rods and having shoes thereon adjacent said support, a retracting-spring coöperating with the ends of the rods at this end of the truck, upright brake-levers fulcrumed on the cross-bar 13 and pivotally secured to the brake-rods above their fulcra, an equalizing-lever connected to said brake-levers above the brake-rods; a brake-beam supported loosely on the ends of the brake-rods opposite said supports and having brake-shoes, an abutment on said brake-rods, and a spring interposed between each of said abutments and the latter brake-beam.

26. In a brake mechanism, the combination with the car-truck having a frame, including a cross-bar as 11, the longitudinally-apertured thrust-block secured to the cross-bar, the brake-rod extending through said aperture, a spring about said extension, a cap fixed on the end of the rod bearing against said spring the other end of the spring bearing against the thrust-block, said rod carrying beams and shoes for the respective sets of truck-wheels, a support for the brake-rod upon the truck-frame other than the thrust-block, and means for longitudinally moving the brake-rod for applying the respective sets of shoes to the sets of wheels.

27. In a car-truck, the combination with a frame thereof, and a brake mechanism comprising a longitudinal brake-rod having the slotted yoke 32, a pendent portion 40, and an extension 41 therefrom; a cross-bar 13 disposed below the said brake-rod, and a brake-lever 35 pivotally secured to the cross-bar 13, passing through the slot, and pivotally secured to the yoke, and brake beams and shoes operated by said lever and rod, substantially as described.

Signed at the city and county of Philadelphia, State of Pennsylvania, this 24th day of July, 1900.

WALTER S. ADAMS.

Witnesses:
WM. J. FERDINAND,
TERRENCE MCCUSKER.